Patented Oct. 29, 1935

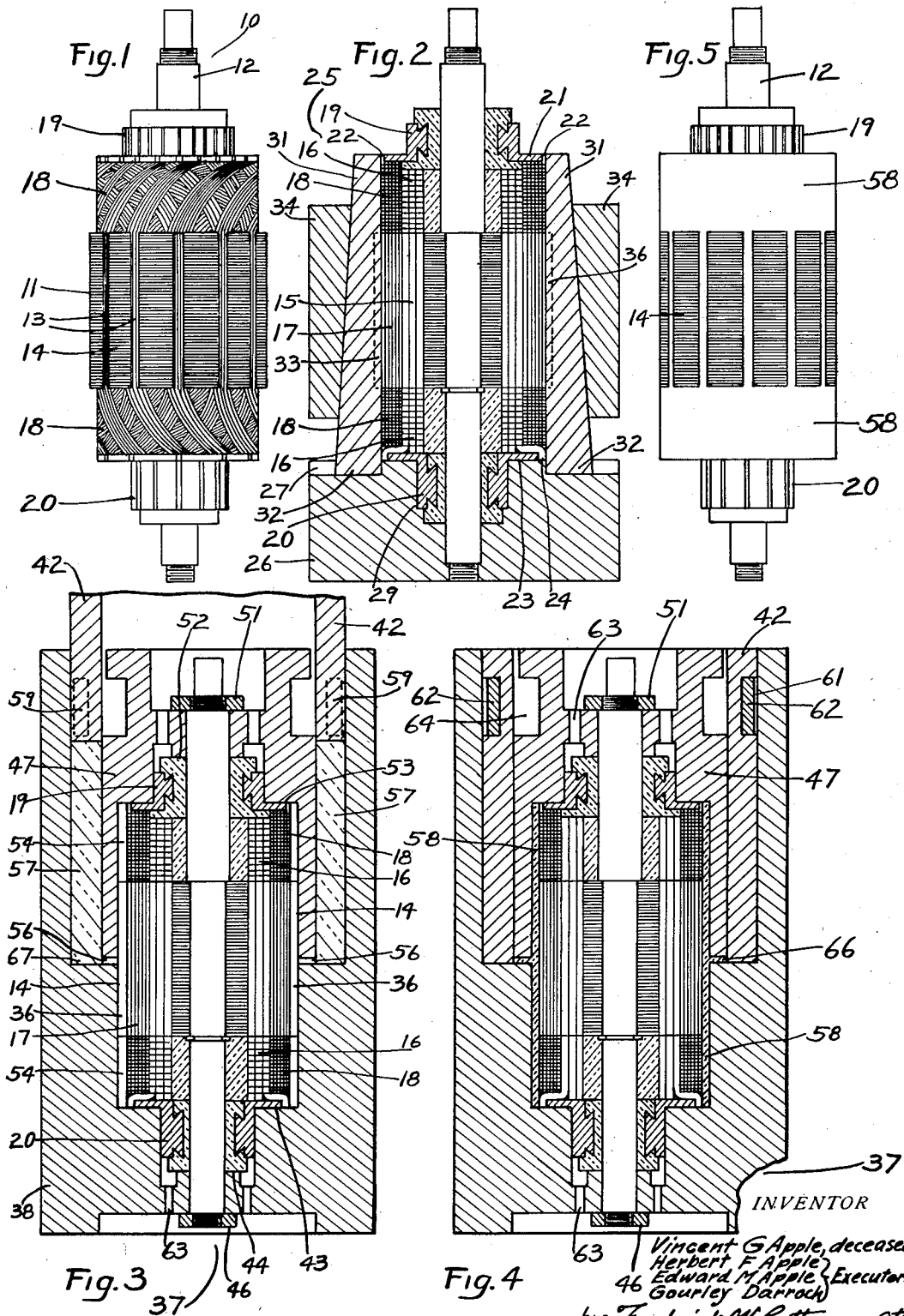

2,019,064

UNITED STATES PATENT OFFICE 2,019,064

ARMATURE MOLD

Vincent G. Apple, deceased, late of Dayton, Ohio, by Herbert F. Apple, Edward M. Apple, and Gourley Darroch, executors, Dayton, Ohio Application December 2, 1933, Serial No. 700,720

4 Claims. (Cl. 18—42)

This invention relates to armatures and particularly to those having a slotted core, a winding in the slots, and a commutator at each end of the winding.

The object of the invention is to provide an armature of this type together with means and a method of producing it which will have a better running balance and less wind resistance to rotation, and wherein the windings will be impervious to moisture or other foreign matter, by molding a jacket of thermo-plastic insulation which will, in a single concentric piece, extend through and about the winding heads at the ends of the core and through and about the coils where they pass through the core.

It has heretofore been proposed to mold an impervious jacket of insulation through and about the core and coils of an armature having a commutator at one end only, but when, as in the present invention, the core is comparatively long and there is a conventional commutator at each end, with risers which extend to nearly the outer diameter of the armature, the problem is somewhat more difficult. The inventor solved this problem by the procedure and apparatus hereinafter described, reference being had to the drawing wherein—

Fig. 1 is a plan view of a wound armature with commutator in place.

Fig. 2 shows the armature in a fixture for pressing the coils toward the bottoms of the slots.

Fig. 3 shows the armature in a mold together with a proper quantity of unmolded thermoplastic insulation.

Fig. 4 shows the mold Fig. 3 after it is closed and the jacket is molded.

Fig. 5 shows the completed armature after it is removed from the mold.

Similar numerals refer to similar parts throughout the several views.

In the armature 10 which has been selected to illustrate the invention the core 11 is mounted on the shaft 12 to rotate therewith. The winding slots 13 are separated by teeth 14 and are of sufficient depth to admit two windings. A winding comprising coil sides 15 and end turns 16 of coarse wire is wound into the inner half of the slots. Another winding of finer wire comprising coil sides 17 and end turns 18 is wound into the outer half of the slots. Commutators 19 and 20 are secured to opposite ends of the shaft. The finer wire winding is electrically connected to the risers 21 of commutator 19 at 22 and the coarser wire winding is electrically connected to the risers 23 of commutator 20 at 24. The armature 10 then appears as in Fig. 1.

In an embodiment of the invention such as is herein shown, where the outer winding is of comparatively fine wire, the windings are preferably put through some hardening process to make them rigid before attempting to mold a jacket of insulation about them. This hardening process may be accomplished by introducing a liquid insulating material into the windings and baking it. The liquid insulation may be gotten into the windings in several different ways, by dipping them, by placing the wound armature into an impregnating tank and forcing the liquid into the winding, or by drawing the wire through a tank of the liquid before it is wound into the coils. But however the liquid is introduced into the windings it is put into an oven or otherwise treated to harden the windings and make a rigid structure before a jacket of thermo-plastic insulation is molded about them.

It is highly desirable that the jacket of insulation which surrounds the windings be in one continuous piece in which the portions of the insulation mass which enclose the end turns 16 and 18 are connected by a series of integral struts of the same material which pass through the winding slots and cover the coil sides 15 and 17 contained therein. It is therefore a part of this process to provide space in the outer ends of the winding slots for such integral struts of insulation.

Fig. 2 shows the armature after the coils have been saturated with liquid insulation but before they have been baked or otherwise treated to harden them. The armature is here shown in a fixture 25 which is designed to force the coils toward the bottoms of the winding slots in order to leave a small portion at the outer edge of each slot vacant after the liquid has been hardened. The fixture comprises a base 26 having as many radial slots 27 as there are winding slots in the core. Slots 27 are of the same width as the winding slots are at their outer edges. The base is cupped out at 29 to receive the commutator 20.

With an armature 10 in the base 26, a series of wedges 31, corresponding in number to the slots in the core, are placed with their wide ends 32 in the slots 27 of the base and their edges 33 in the winding slots 13 of the core. A tapered ring 34 is then pressed downward over the series of wedges 31 to hold the coil sides 15 and 17 to the bottoms of the core slots, whereupon the armature and fixture are heated or otherwise treated to harden the coils. When the winding has been hardened and the fixture 25 has been removed the winding slots will have vacant passages 36 at their outer edges (see Fig. 3), and the armature is now ready to have the jacket of thermo-plastic insulation molded around it.

Fig. 3 shows the armature in the mold 37, which comprises a body 38, preferably of square cross section, with a cylindrical opening of several different sizes, the lower end fitting the commutator 20, the middle fitting the core teeth 14 closely, and the upper end being adapted to receive the slidably fitted hollow plunger 42. The commutator 20 rests on shoulders 43 and 44, and the nut 46 holds the armature against upward movement in the body 38.

A cylindrical cap 47 covers the upper half of the armature in substantially the same manner as the body 38 covers the lower half. Cap 47 at its lower end fits the core teeth 14 and at its middle part the commutator 19. A nut 51 draws the cap 47 against the armature, the shoulders 52 and 53 resting against the commutator. When the body 38 and the cap 47 are assembled with the armature there is left vacant in the mold two cylindrical spaces 54 around the end turns 16 and 18 which are connected by a plurality of the passages 36 extending along the coil sides 17. The cap 47 is of such length that its lower end is slightly spaced apart from the body 38 so as to leave the narrow passage 56.

With the armature assembled in the body 38 and the cap 47 in place the structure together with the hollow plunger 42 is heated, and when a predetermined temperature is reached a preformed cylindrical slug 57 of thermo plastic insulation is put in the upper end of the body 38 and the plunger 42 is entered and pressure applied thereto (see Fig. 3). When the slug 57 absorbs sufficient heat from the mold to become plastic the plunger 42, due to the pressure thereon, will move downwardly, forcing the insulation through the narrow passage 56, downwardly and upwardly through the passages 36 left by the wedges 31 into the cylinder spaces 54, forming around the winding a jacket 58 (see Fig. 4) of insulation which is substantially continuous except where the core teeth 14 cut through it to the outside (see Fig. 5).

Fig. 4 shows the mold 37 closed, all of the slug 57 having been transferred through the passage 56 to form the jacket 58. Horizontal openings 59 (see Fig. 3) through the body 38, and an annular groove 61 (see Fig. 4) around the plunger 42 are at the same height when the mold is closed so that the locking bars 62 may be entered therethrough to hold the mold closed until hardening of the insulation has taken place. Vent holes 63 permit the escape of air and other gases from the mold.

When the insulation jacket 58 (see Fig. 4) is hard the nut 46 is removed and the armature together with the cap 47 is pushed upwardly from the mold. The nut 51 is then removed and the cap is held by the groove 64 and the armature pushed from the cap. When the fin 66, left in the passage 56 has been turned off or otherwise removed the armature appears as in Fig. 5.

From a consideration of Fig. 5 it will be seen that the armature is substantially a solid cylinder of insulation with the windings completely enclosed therein, the outer surfaces only of the core teeth extending through the periphery and the two commutators protruding from the ends. Such a structure is impervious to oil, moisture, acid fumes and other foreign matter to which armatures in certain situations are subjected, and while Patent No. 1,642,057 covers a double wound armature having a jacket of insulation, the process and the tools herein disclosed for arriving at such a product are thought to patentably differ from any heretofore proposed.

First, in molding plastic insulation about a fragile structure, such as a core carrying a winding, the apparatus is preferably so constructed that it is impossible to force the unmolded insulation against the winding until it becomes reasonably plastic, and the herein disclosed apparatus meets this requirement in that the heavy downward pressure on the plunger 42 only serves to force the preformed slug 57 of unmolded insulation against the shoulder 67 of mold body 38, and it is not until the slug 57 softens, that it is possible to force it laterally from under the end of the plunger 42 through the narrow passage 56 to the winding.

Second, when molding compounds are employed in which the period of reaction is short, it is important that no great volume of the unmolded insulation be very far removed from a heated wall of the mold, for, since fluxing of the charge depends on heat drawn from the walls of the mold with which it is in contact, it is readily seen that where the apparatus is so constructed that the charge is in the form of a large solid cylinder, the center of such a cylinder being far from the mold wall will likely be so slow in becoming fluid that its outside will be cured before its center is fluxed, and it is with this difficulty in mind that the stock chamber of the mold herein disclosed, and the preformed slug of insulation which it contains, is molded in the form of a hollow cylinder, so that the thin walled slug is in contact both inside and outside with a heated wall of the mold, and will consequently become fluid through and through before the outer surfaces have reacted and become hard.

Third, in molding the thin walled jacket 58 of insulation the plastic compound must travel through a considerable length between two heated walls that are close together, and unless the insulation, immediately before it becomes plastic, is moved rapidly into its final position, that part of it which necessarily travels farthest sometimes becomes hard before it reaches its final place, and it is with this difficulty in mind that the narrow passage 56 has been placed midway of the length of the armature instead of at the end, so that the outer ends of the jacket 58 need travel only half the armature length between the close together hot surfaces of the mold on the outside and the armature winding on the inside.

Having described an embodiment of the invention, it is claimed:

1. For molding a jacket of insulation around the winding of an armature, a mold comprising a body having a cavity of slightly greater diameter than the winding and slightly less than half its length with an opening to concentrically support the one-half of said armature in said body, a cap having a cavity of slightly greater diameter than the winding and slightly less than half its length, with an opening to concentrically support said cap on said armature, said body having a stock chamber surrounding said cap at some distance therefrom, and a plunger in the form of a hollow cylinder having outer diameter slidably fitted to said stock chamber and inner diameter slidably fitted over said cap.

2. A mold such as is defined in claim 1 but with an annular groove around said plunger, corresponding openings through said body and locking bars in said groove extending through said openings.

3. In a mold for molding an article of thermo plastic material, a mold body containing a cavity of the shape of the article to be molded and a stock chamber in the shape of a hollow cylinder encircling the mold cavity at such distance therefrom as to leave a wall between the mold cavity and the encircling stock chamber, said wall being interrupted at the bottom of said stock chamber thereby connecting said stock chamber and said cavity by a narrow passage at said bottom, and a mold plunger in the form of a hollow cylinder slidably fitted to said encircling stock chamber.

4. A mold for molding an article of thermoplastic material comprising a body containing a cavity of the shape of the article to be molded and a stock chamber in the shape of a hollow cylinder encircling the mold cavity at such distance as to leave a mold wall between said stock chamber and said cavity, and a plunger in the shape of a hollow cylinder slidably fitted to said encircling stock chamber, said stock chamber being connected at its bottom to said mold cavity by a narrow restricted passage.

HERBERT F. APPLE,
EDWARD M. APPLE,
GOURLEY DARROCH,
*Executors of the Estate of Vincent G. Apple, Deceased.*